Dec. 21, 1937. W. T. OBER 2,103,206
APPARATUS FOR WELDING NAILS TO A METAL BODY
Filed Nov. 5, 1936 4 Sheets-Sheet 4

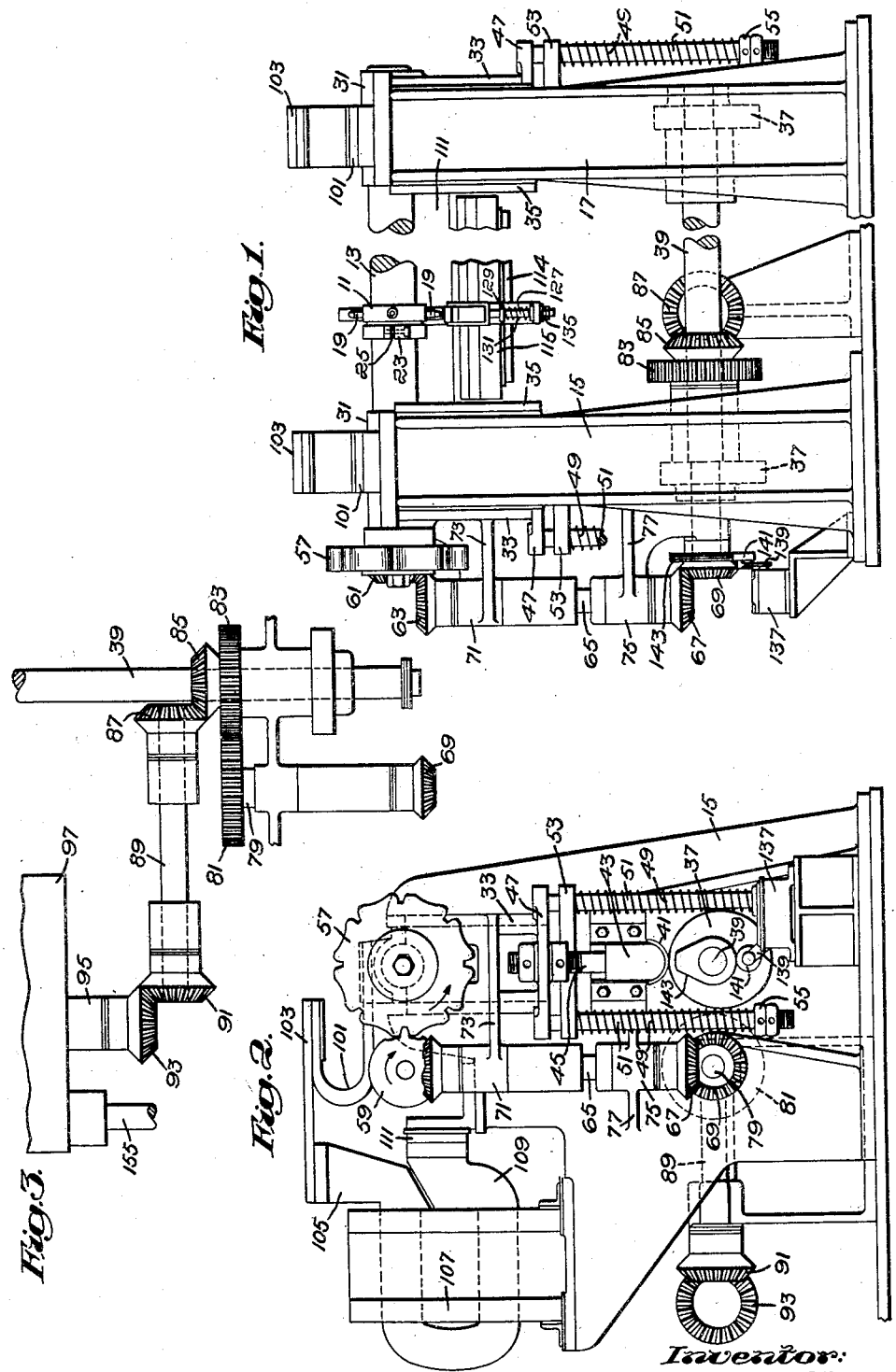

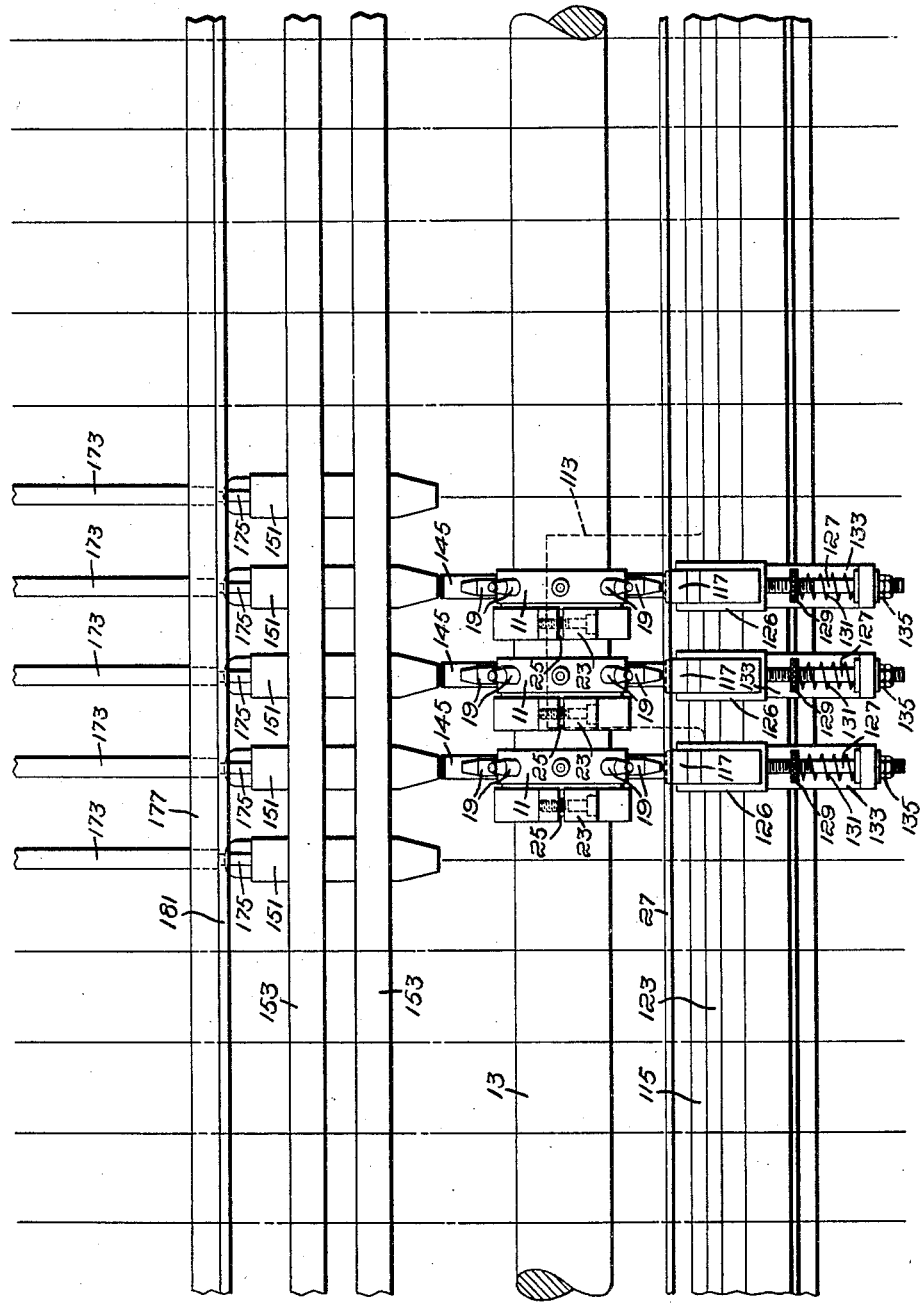

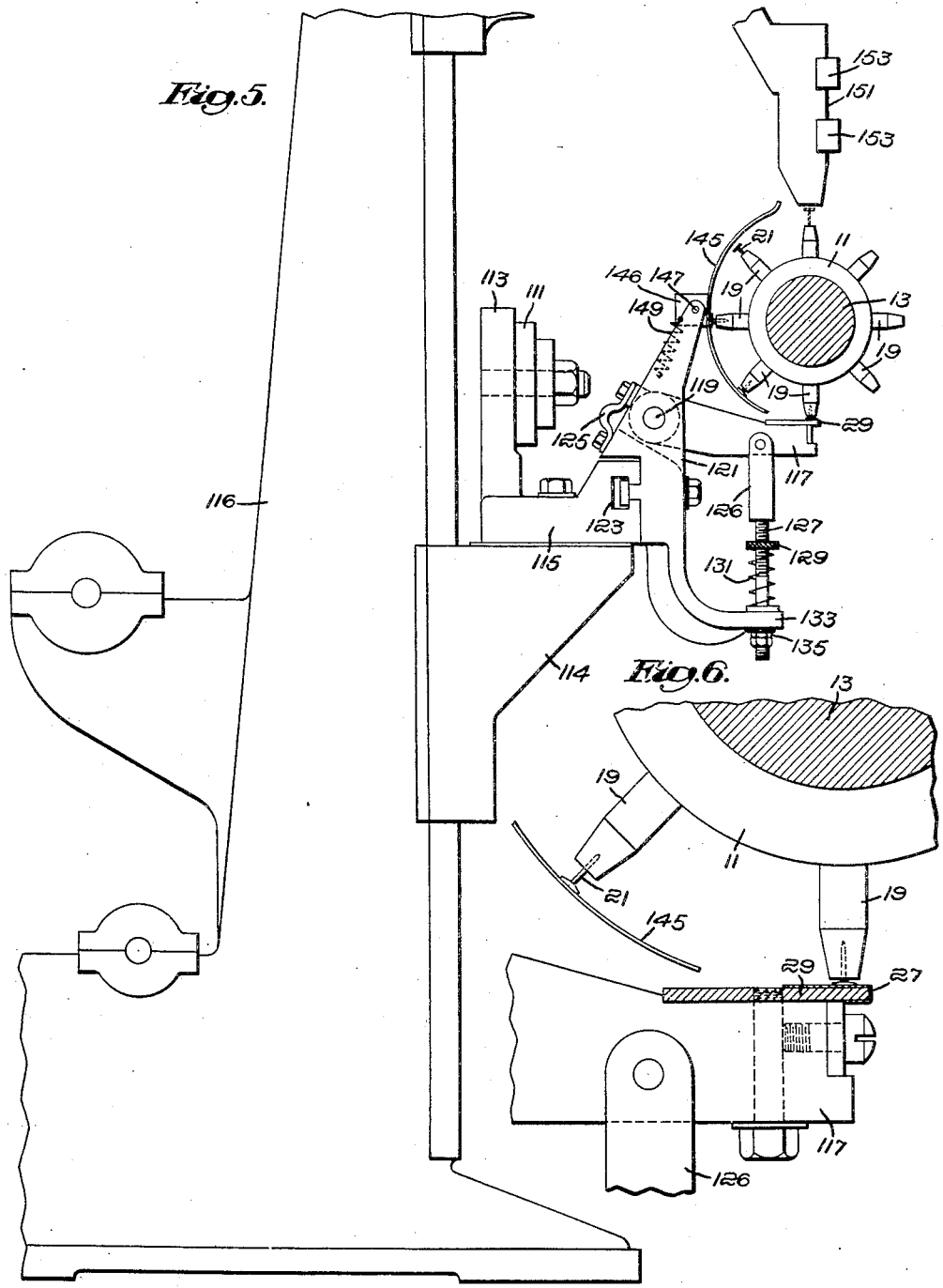

Inventor:
William T. Ober,
By Emery Booth Townsend Miller Weidner Attys

Patented Dec. 21, 1937

2,103,206

UNITED STATES PATENT OFFICE 2,103,206

APPARATUS FOR WELDING NAILS TO A METAL BODY

William T. Ober, Marblehead, Mass., assignor to Thomson-Gibb Electric Welding Company, Lynn, Mass., a corporation of Massachusetts Application November 5, 1936, Serial No. 109,345

2 Claims. (Cl. 219—4)

This invention relates more particularly to methods of and machines for automatically attaching nails or the like in spaced relation to a sheet-metal strip or the like by welding the heads of the nails to the surface of the strip.

One object of the invention is to provide a machine of simplified construction, rapid and efficient operation, wherein, in a single operating cycle of the machine, a series of nails may be simultaneously spot welded in any desired spaced relation to such a strip while the latter is held stationary, the machine being then brought to rest and successive strips placed in operative relation to the welding devices for repetitions of the cycle of operation.

The invention will be best understood by reference to the following description when taken in connection with the accompanying drawings showing one illustrative embodiment thereof, while its scope will be more particularly pointed out in the appended claims.

In the drawings:

Fig. 1 is a front, partial elevation of a portion of the machine for effecting the coordinated movements of the nail carrying turrets, the nail feeding devices not being shown, and the machine being broken away and showing but a single turret;

Fig. 2 is a side elevation of parts of the machine shown in Fig. 1;

Fig. 3 is a plan of certain parts of the driving mechanism;

Fig. 4 is a front elevation showing the relation of the nail carrying turrets and the turret shaft;

Fig. 5 is a side elevation in partial section, showing the relation of one of the nail carrying turrets to the work support and welding devices;

Fig. 6 is an enlarged detail of certain parts shown in Fig. 5; and

Figure 7:
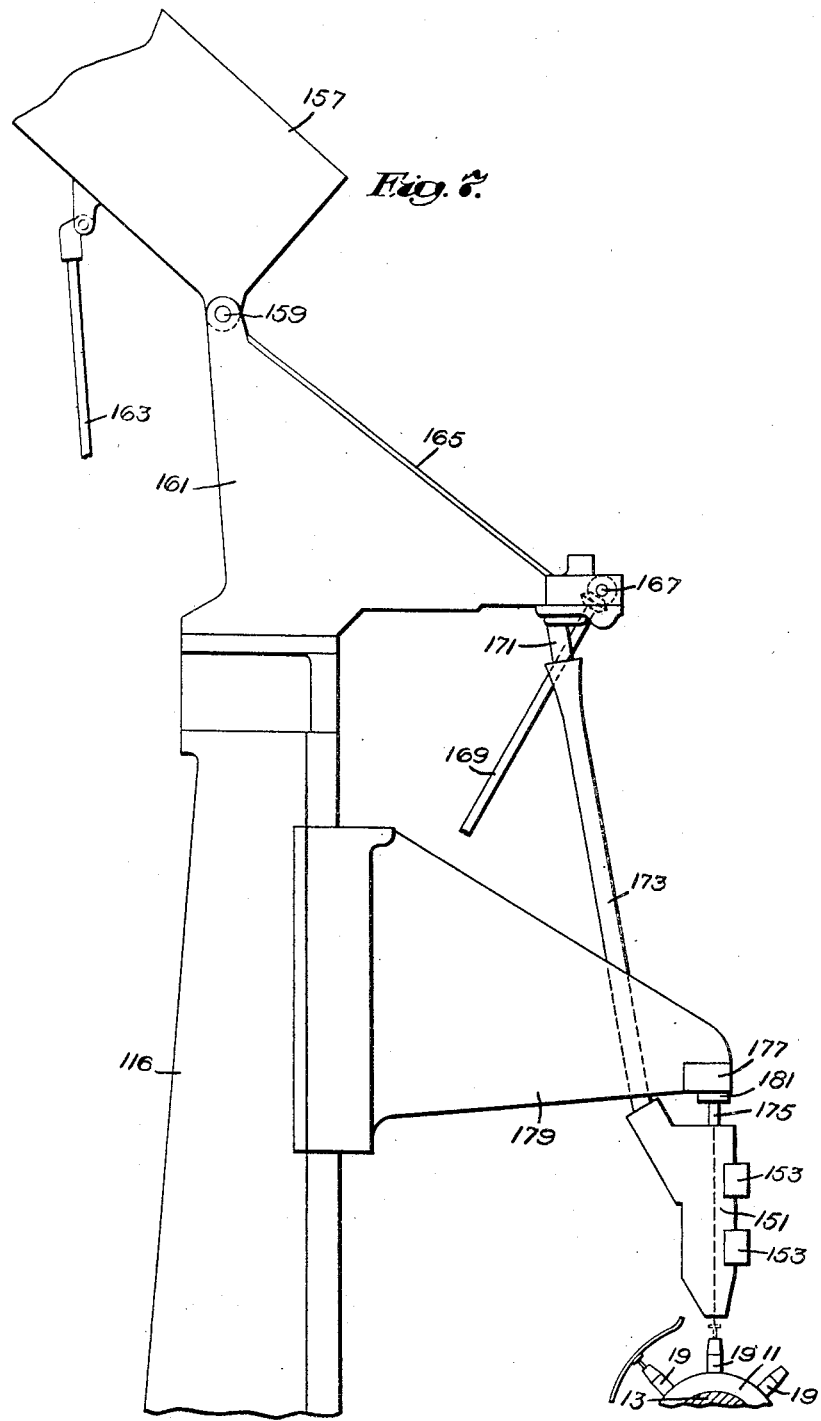
Fig. 7 is an elevation, more or less in outline, showing the machine for feeding nails to the several turrets.

Referring to the drawings and to the embodiment of the invention therein shown, the devices for carrying and presenting the nails to the work consist of an extended series of nail carriers comprising turrets 11 mounted on a turret shaft 13 of conductive metal which extends between the pedestals or columns 15 and 17, so that the turrets move in unison with the shaft both in respect to rotation and vertical movement.

A number of such turrets (as, for example, sixteen or more) is employed, equal to at least the number of nails to be welded on a single strip, and they are spaced apart so as to apply the nails to the metal strip in the desired spaced relation thereon. This is indicated, for example, in Fig. 4 where three turrets side by side are shown, and the position of successive turrets indicated by dotted lines.

Each turret (Figs. 4, 5, and 6) comprises a sleeve of conductive metal, carrying circumferential, equally spaced, radial projections 19 (herein eight in number) constituting nail holders. When the turrets are turned, the nail holders of the respective turrets travel through parallel planes at right angles to the axis of the shaft and spaced to conform to the spacing of the nails when welded to the metal strip.

Each holder has an axial bore of sufficient depth to receive and carry a nail 21 when the point or shank thereof is inserted in the tip of the holder, as indicated in Figs. 5 and 6. The term "nail" is used generically to indicate any nail, tack, or similar headed article. At the side of each sleeve and integral therewith is a similar sleeve 23 but split at one side on the line 25 so that it may be clamped tightly to the turret shaft. To change the spacing of the welded nails on the metal strip, therefore, the entire series of turrets may be adjusted in any desired spaced relationship lengthwise the shaft. The entire series of turrets are angularly adjusted on the shaft 13 so that corresponding nail holders are in longitudinal alignment and a nail holder on each of the series of turrets may be simultaneously presented in upright vertical position.

The metal strip to which the series of nail heads is to be welded may be of any desired shape, but in the application of the invention herein shown, and as indicated by cross-section at 27 in Fig. 6, it is in the form of a flat strip of metal one side of which is bent into a U-shape formation. When inserted in the machine and presented to the welding operation, it is parallel to the axis of the turret shaft, resting on and fitting over the projecting edge of each one of a series of plates 29, one such plate being provided to correspond to each nail turret and aligned with the nail holders thereof. These plates constitute the lower dies and electrodes and collectively serve as a work rest, the nail carrying turrets, through their connection with the turret shaft, serving as the other electrodes, as will be shortly explained.

In the operation of the machine, on the starting thereof, the turret shaft is turned so that a filled nail holder on each one of the series of turrets is placed at right angles but in spaced relation to the underlying metal strip, the turret shaft being depressed to force each nail head against the face of the strip. The circuit is simultaneously closed to cause the passage of welding current from the nail holder through the nail head and strip to the underlying electrode, thereby simultaneously and at one operation welding the heads of the entire series of nails to the metal strip. The turret shaft, while held against turning movement, is then raised, freeing the entire set of nail holders from the welded heads and bringing the upper oppositely disposed nail holder of each turret in an operative relationship to receive a nail from the nail delivery mechanism. The shaft is brought to rest, the metal strip with its series of welded nails withdrawn, and another strip inserted to repeat the same cycle of operations.

To provide the necessary coordinated movements of the turret shaft, the latter (Figs. 1 and 2) is mounted at each opposite end in bearings 31 supported each on a vertically sliding head or bracket 33 movable in guideways 35 formed in the pedestals or columns 15 and 17.

Each head has imparted to it a properly timed vertical movement by devices which are substantially the same at each opposite end of the machine. These comprise the cam 37 on the cam shaft 39 engaging a cam roll 41 carried by a vertical slide 43, the upper end of which is connected by the rod 45 to a plate 47 secured to the bottom of the head 33. The cam 37 serves simultaneously to raise and lower the sliding heads and the opposite ends of the turret shaft, a lifting movement taking place against the action of the compression spring 49 encircling the rods 51 depending from and secured to the plate 47, one end of each spring abutting against the stationary plate 53 secured to the pedestal and the other end against the collar 55 carried by the lower end of the rod.

In the course of each cycle of operation the turret shaft is given the necessary turning movement (herein ⅛ of a revolution) to bring a nail carrying holder into operative relation to the metal strip by means of a gear member 57 secured at one end thereof and having eight peripheral notches adapted to mesh with the single tooth of a driving member 59 (Fig. 2) so that for a brief period in each rotation of the driving member the turret shaft is moved ⅛ of a revolution and thereafter locked by the member 59 against further rotation.

The driving member 59 is driven through beveled gears 61 and 63, the latter through a vertical shaft 65, driven in turn through beveled gears 67 and 69. To maintain engagement of the gear 57 with the gear 59 and that of the beveled gears 61 and 63 at all times during the raising and lowering of the turret shaft, the beveled gear 63 is capable of a vertical sliding movement with respect to the shaft 65 while partaking of its rotation, being rotatively carried by a sleeve 71 supported on a bracket 73 secured to the vertically movable head 33, the bracket also supporting the bearings for the driving member 59. The shaft 65 itself is mounted in bearings 75 secured by the arms 77 to the pedestal 15. The rotation of the driving mechanism therefore is such that with the rotatable driving shaft 65 vertically fixed, the beveled gears 61 and 63 and the driving and driven members 57 and 59 maintain at all times the intermeshing engagement as shown in Figs. 1 and 2, irrespective of the raising and lowering of the turret shaft 13, which, it will be evident, is simultaneously raised and lowered at both opposite ends so as to raise and lower simultaneously the entire series of turrets.

The beveled gear 69 is secured to the end of a short counter-shaft 79 (Figs. 2 and 3) carrying the gear 81 driven by the gear 83 on the cam shaft 39, the proportions of the gearing being such that for each complete rotation of the cam shaft and the cam 37 the toothed driving member 59 is turned through one complete revolution.

The cam shaft in turn is driven through beveled gears 85 and 87 from the shaft 89, which in turn is driven through beveled gears 91 and 93 from a shaft 95 extending from the nail distributor driving mechanism indicated (Fig. 3) diagrammatically at 97.

To supply welding current to each of the turrets through the cam shaft, each of its bearings has fastened to the top thereof and in electrical contact therewith a prolonged U-shaped resilient contact plate 101 secured in turn to a similar contact plate 103, the latter having electrical connection to the secondary terminal 105 of the transformer 107 for supplying high amperage and low voltage.

The other terminal 109 of the transformer is connected to a conducting plate 111 extending lengthwise the machine, parallel with and back of the turret shaft, this plate being connected near the middle of the machine by an upright plate 113 (see dotted lines in Fig. 4) with a horizontal conductive plate member 115. The latter extends the full length of the machine and is supported by and insulated from a table 114 (Fig. 5) carried by the tall upright pedestal 116 near the middle of the machine back of the cam shaft.

The plate member 115 serves as a support for, as well as an electrical connector to, the series of separate nail welding electrodes or die plates 29, one beneath and aligned with the nail holders of each turret. To this end (Figs. 5 and 6), each plate 29 is secured to the top of an arm 117 at the end thereof, the arm being pivoted at 119 on an upright bracket 121 which is clamped to the face of the plate member 115 by means of a bolt engaging a T-slot 123 formed lengthwise in such face. This permits adjustment of the electrodes lengthwise the machine to adapt them to any changed spacing of the turrets. The arm 117 has a flexible electrical connection 125 to the bracket 121.

To the other end of the arm is pivotally connected by the link 126 a depending rod 127 carrying a collar 129 and encircled by a compression spring 131, the upper end of which abuts against the collar 129 and the bottom against a curved extension 133 of the bracket 121 underlying the end of the arm 117. The rod 127 is arranged for sliding movement through the bracket extension and carries a stop member 135 below the latter, so that, except when the turret shaft 13 is depressed to effect welding, the arms 117 are maintained in a fixed vertical position. When, however, the nail head is forced against the metallic strip, each arm, carrying the electrode plate on which the strip rests, is permitted to yield slightly against the compression of the spring 131.

In the operation of the machine, simultaneously with the depression of the turret shaft to its lowermost position to force the head of the nail carried by the lowermost nail holder against the metal strip, welding current is simultaneously passed through each nail holder to the nail and through the adjacent portion of the strip. For this purpose the primary circuit of the transformer is closed by means of a switch, indicated at 137 (Figs. 1 and 2), actuated by an arm 139 carrying the cam follower 141 engaging the cam 143 on the cam shaft 39. The secondary current then passes through a circuit which extends from the terminal 105 of the transformer and the resilient contact plate 101 to opposite ends of the cam shaft, thence through the shaft to each one of the turrets and to the nails engaged with the strip through the nail holders thereof. Through the strip it extends to the series of underlying arms 117 to the plate holder 115, through the latter to the central connector and the conducting plate 111 and to the other terminal 109 of the transformer.

Cooperatively related to each turret there is provided a curved nail retaining strip 145 (Fig. 5) secured to a block of insulating material 146, the latter pivoted at 147 on the bracket 121 and tilted by the spring 149 so as to press the strip against the heads of the nails in the turret which might otherwise gravitate out of their respective holders in the course of movements of the turret shaft.

As the turrets are turned between successive welding operations and an empty nail holder at the top of each turret is brought to an upright position and the turret shaft lifted to its uppermost elevation, nails are simultaneously inserted point downward in the nail holder of each turret from an aligned overhead nail chuck 151, the nails being delivered to each chuck of the series by a nail distributing mechanism. These nail chucks are supported in adjustable spaced relation on supports such as the bars 153 extending lengthwise the machine.

Any of several well-known nail distributing mechanisms forming parts of well-known nailing machines may be employed for the purpose of automatically supplying the empty nail holders with nails.

In the case of the present invention there is illustrated in Fig. 7 more or less diagrammatically, as applied to the welding mechanism described, the principal elements of such a machine corresponding to those disclosed in prior patents to Morgan and more particularly in Patents Nos. 556,430, 586,711, 587,321, and 1,063,718.

The driving mechanism for the nail distributor is contained within the casing, partly indicated at 97 in Fig. 3. Power is applied to a main driving shaft, such as the shaft 155, from any suitable source, as, for example, an electric motor with interconnecting gearing (not shown).

Referring more particularly to Fig. 7, the nail distributing mechanism comprises one or more tilting nail hoppers 157 pivoted at 159 to the bracket 161 supported at the top of the pedestal 116, the upper part only of which is shown in Fig. 7. The hopper 157 is oscillated to agitate a supply of nails contained therein by means of a connecting rod 163 which is given a reciprocating movement from the driving mechanism contained within the casing 97. The agitation of the hopper acts to separate the nails and deliver them to transfer slots or channels formed between the plates 165 through which the nails gravitate to the lower end of such slots, there being one such delivery slot for each of the several turrets. Such a hopper and the nail delivery channels may be constructed and function in the general manner indicated in Patent No. 556,430.

The leading nail in each one of the series of nail channels is then picked off by a series of rotary selector disks, similar to those described in Patent No. 586,711. These disks are driven from a horizontal worm shaft 167, which in turn is driven by the shaft 169 connected to the driving mechanism of the nailer in the casing 97. Each nail picked off is dropped into the underlying chute 171, passing by gravity through the extension 173 thereof and delivered to the nail chuck 151 where it is held preparatory for ejection. The chutes 173 are so constructed and connected that they can accommodate themselves to any reasonable spacing adjustment of the chucks and the nail turrets for the purpose of changing the spacing of the nails welded to the strip, there being of course one chuck and one chute corresponding to each nail turret of the series.

Each nail chuck 151 is constructed as indicated, for example, in Patents Nos. 556,430 and 587,321, so that the nail is transferred from the chute 173 to an inclined nail channel in the chuck, whence it passes into a vertical channel, at the bottom of which it is held for its subsequent ejection and transfer to a nail holder of the underlying turret. The nail in each chute is then ejected at the appropriate time, and transferred to the then empty nail holder on the turret, as the latter is lifted into alignment with the chuck, by a nail ejector 175 carried by a cross-bar 177 secured to a head 179 which is given a properly timed vertical reciprocating sliding movement on the pedestal 116, the head being raised or lowered by a driving connection (not shown) to the nailer driving mechanism. The nail ejectors consist of small elongated rods and are secured to the cross-bar 177 for longitudinal adjustment thereon to accommodate themselves to different spacings of the nail turrets, as, for example, by means of a slotted bar 181, similar to that indicated for the nail drivers in Patent No. 556,430.

The nailer mechanism may be started from a condition of rest into operation by means of a foot treadle and associated devices, by which it is caused to make a complete cycle of operation, including the release of a nail into each chute and chuck of the series and its properly timed ejection into each underlying nail holder, after which it is automatically brought to rest. This may be accomplished by any well-known mechanism, such, for example, as that shown in prior Patent No. 586,711. The welding mechanism is simultaneously operated from the nailer driving mechanism through the shaft 95, so that, from a condition of rest, the turret starts its movement and, simultaneously with the nailer mechanism, completes the cycle of operation and effects the welding to the metallic strip of the entire series of spaced nails.

In the operation of the machine, the operator, having inserted a metal strip sidewise on the work rest (as shown in Figs. 4 and 6), starts the machine into operation by depressing the foot treadle. At this instant the empty nail holder at the top of each turret is in close underlying proximity to the chuck 151. The entire series of nail ejectors 175 is thereupon depressed to refill each of the series of underlying empty nail holders, the nail selectors being turned by the worm shaft 167 as soon as the ejectors are again raised to drop another nail into the chute. The toothed member 59 thereupon starts the turning of the counter-shaft counter-clockwise (as viewed in Figs. 2, 5, and 6) to move the lowermost empty nail holder of each turret out of, and the next succeeding filled nail holder into, vertical alignment with the face of the strip, the shaft and each of the series of turrets simultaneously undergoing a movement of depression through the action of the cam shaft 37. The shaft reaches its lowermost position after the cessation of its turning movement, in which position the nail holders are pressing the series of nail heads against the face of the strip which has yielded slightly under the action of the springs 131. The actuation of the switch 137 by the cam 143 causes the passage of welding current through the nail heads to the strip, welding them together.

Further movement of the cam 37 then lifts both ends of the turret shaft, raising the turrets and freeing the nail holders from the shanks of the welded nails and restoring the turrets to their initial or starting position, whereupon the driving mechanism is automatically thrown out of gear.

The strip, with the welded nails attached thereto, is then withdrawn and replaced by another strip, to which a series of spaced nails is then welded by a repetition of the above described operation.

While I have herein shown and described for the purpose of illustration one specific embodiment of the invention, it is to be understood that extensive deviations and changes in the form and relative arrangement of parts herein illustrated may be made, all without departing from the spirit of the invention.

I claim:

1. A machine for welding nails to a metal strip or the like, comprising a series of coaxially mounted, rotatable nail carrying turrets having each a plurality of equally spaced, radial nail holders adapted each to receive and carry a nail, a turret shaft on which said turrets are mounted and by which said turrets are turned, means for holding a metal strip adjacent said turrets and parallel to the axis thereof, said carriers being angularly fixed on said shaft to bring the nail holders of successive carriers in an aligned spaced serial relation and said nail holders, when said shaft is turned, moving in paths lying in spaced planes at right angles to said shaft and to said strip, vertically sliding heads in one of which each opposite end of said turret shaft is mounted, columns in which said heads are mounted for vertical sliding movement, means also carried by one of said heads for turning said shaft, thereby simultaneously to turn said turrets and present a longitudinal series of nail holders in operative relation to said strip with their nails at right angles to and the nail heads adjacent said strip, means coordinately to move said sliding head and thereby said shaft and turrets to press the heads of the series of nails against said metal strip in spaced relation lengthwise the same, and means for passing a welding current simultaneously through the entire series of nails and contacting portions of said strip to weld the nails thereto.

2. A machine for welding nails to a metal strip or the like, comprising a turret shaft, a plurality of turrets each carrying a series of radial nail holders with means for adjustably securing the turrets in coaxial, spaced relation on said shaft, means for holding a metal strip in operative welding relation to nails carried by the nail holders of successive turrets, said strip being parallel to the axis of said shaft, vertical sliding heads in one of which each opposite end of said turret shaft is mounted, columns in which said heads are mounted for vertical sliding movement, turning mechanism for said shaft to simultaneously turn said plurality of turrets and present successive sets of nail holders in spaced serial relation to the metal strip, an operating shaft carrying at opposite ends means to raise and lower said shaft and said entire series of turrets, driving connections between said operating shaft and said turning mechanism to coordinately turn said shaft, and welding devices to weld said series of nails carried by said nail holders simultaneously to said strip.

WILLIAM T. OBER.